Patented May 3, 1932

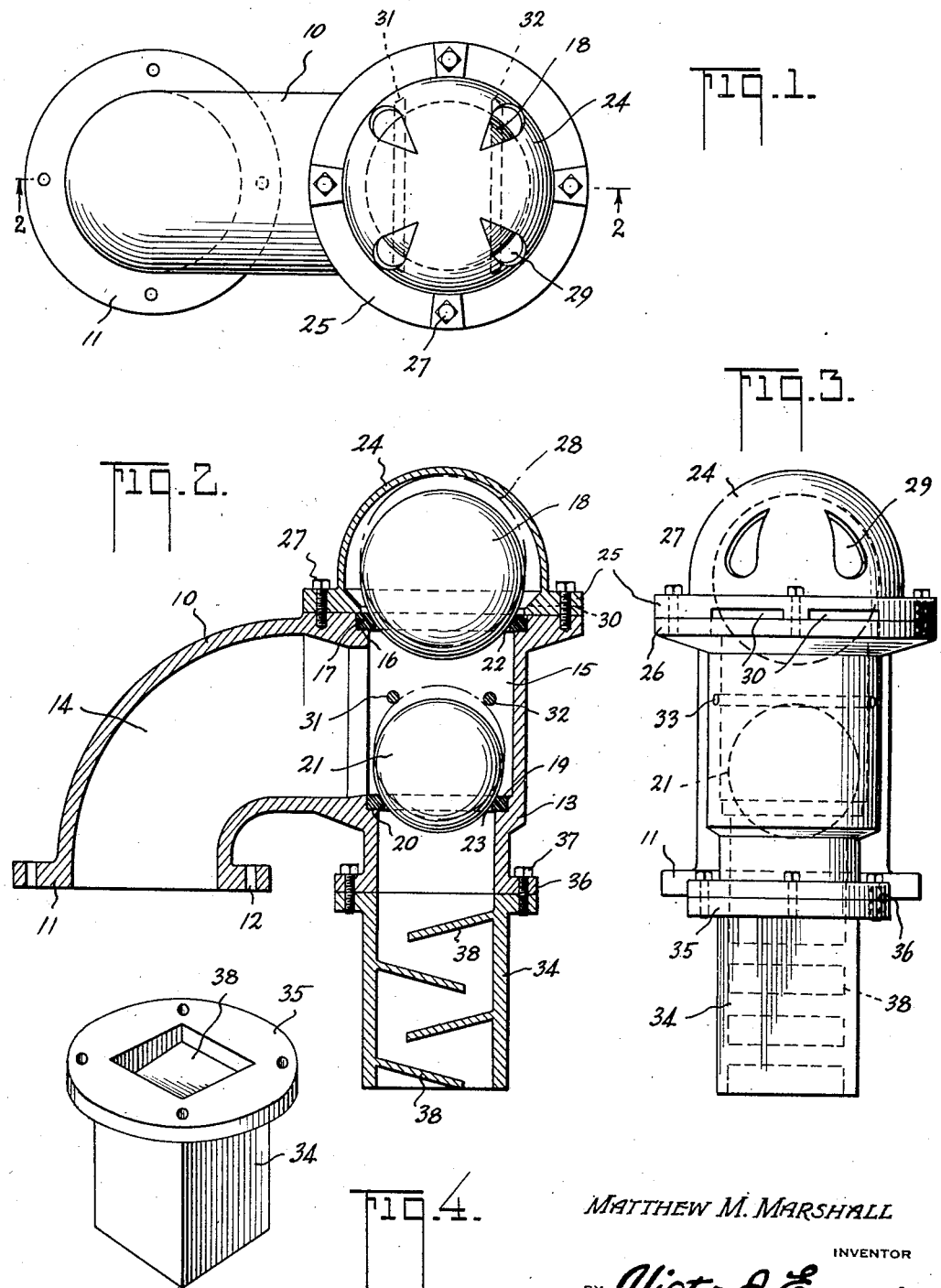

1,856,492

UNITED STATES PATENT OFFICE

MATTHEW M. MARSHALL, OF NEW YORK, N. Y., ASSIGNOR TO HELEN M. MARSHALL, OF NEW YORK, N. Y.

VENT RELIEF VALVE

Application filed July 14, 1930. Serial No. 467,883.

This invention relates to vent relief and vacuum valves and more particularly to an automatic safety vent for use in connection with oil tank steamers, railways tank cars and the like which are employed to transport gasoline, oil or other inflammable or volatile liquid.

The primary object of the invention is to provide an automatic safety vent relief and vacuum valve which will at all times be tightly closed and is adapted to be opened for escape of pressure from within the tank or the like, or for admission of air to the tank, in accordance with fluctuations in pressure produced by changes in temperature.

Another object of the invention is to provide a vent relief and vacuum valve particularly adapted for use on oil tank steamers, where the lack of such a device has heretofore resulted in buckling of the deck plates and other parts of the vessel caused by an increase in the temperature of the liquid.

Still another object is to provide a vent relief and vacuum valve for marine use so constructed that air or gas may freely enter or escape, according to fluctuations in pressure conditions within the tank or other vessel, and the valve being normally sealed at the inlet and discharge against the admission of sea water, rain or the like.

A further object is to construct a vent relief and vacuum valve in which the valve members are spherical in form, whereby a tight seat will always exist and yet so that the valves may be operated with facility to provide a relatively wide opening.

Yet another object is to simplify and improve the construction and operation of vent valves generally, and to provide a device of this type which may be manufactured economically, installed with facility, which will require practically no attention during its use, and which will be very efficient in its operation.

Other objects and advantages of the invention will be hereinafter specifically pointed out or will become apparent as the specification proceeds.

With the above indicated objects in view, the invention resides in certain novel construction and combinations and arrangement of parts, clearly described in the following specification and fully illustrated in the accompanying drawings, which latter show embodiments of the invention as at present preferred.

In the drawings:

Fig. 1 is a top plan view of my present vent relief valve construction, in a preferred form;

Fig. 2 is a vertical sectional view through the valve;

Fig. 3 is an end elevation; and

Fig. 4 is a perspective view of the air intake portion of the valve.

The vent relief and vacuum valve in this instance includes a casing 10, in this instance formed as a hollow elbow, and being provided with a flange portion 11 at its lower end by which the casing may be secured to any suitable vent pipe or the like, not shown, as for instance by means of bolts passed through the bolt apertures 12. The casing 10 includes, preferably, a vertical extension portion 13 arranged at right angles to the upper terminal of the passage 14 provided within the casing 10, this extension portion constituting a housing for the valve chamber 15.

Means are provided to control the passage of air or gas through the valve chamber 15 in both directions. In this instance there is provided at the upper part of the casing extension 13 an annular recess 16 within which there is preferably formed a valve seat consisting of a ring member 17. This valve seat 17 may desirably be formed of phenolic condensation material or the like, though any desired suitable material may be employed. The valve in this instance consists of a spherical member 18, resting upon the valve seat 17 and thus sealing the upper part of the valve chamber 15. This spherical valve member 18 may be constructed of any suitable material.

At the lower part of the valve chamber 15 there is provided a valve seat 19 substantially similar to the valve seat 17, this valve seat 19 being positioned within a recess 20 formed at the lower part of the casing extension 13.

A second, and desirably smaller spherical valve member 21 rests upon the valve seat 19, this valve 21 being in its essential aspects constructed in a manner similar to the valve member 18.

As thus constructed, the valve 18 seals the exhaust or outlet end 22 of the valve chamber 15, while the valve 21 seals the intake portion of the valve chamber 15 as indicated at 23. Thus, whenever pressure is built up within the tank or other vessel through a change in temperature, the pressure will cause the valve 18 to rise and the gas will thus escape. When the pressure returns to normal, the valve 18 will close, sealing the exhaust or outlet 22. Similarly, when suction is created within the tank or other vessel due to a lowering of the temperature of the contents, such suction will cause the valve 21 to rise from its seat 19, and air will be admitted through the intake portion 23 of the valve chamber.

Means are provided to limit the movement of the valve 18. In this instance a semi-spherical dome 24 is secured to the upper part of the casing 10 and extension 13, this dome 24 having a flange portion 25 secured to a cooperative flange portion 26 on the casing 10 and extension portion 13, by means of suitable bolts 27. This dome surrounds the upper part of the spherical valve 18 and serves to limit the movement of the valve to its open position as indicated by the dotted lines at 28.

To permit the gas to escape through the dome 24, suitable vent apertures 29 are provided in the dome. To prevent sea water or rain from collecting within the dome above the valve 18 with the consequent likelihood of such water finding its way into the vessel when the valve 18 may be off its seat, I provide suitable drain apertures 30 at the base of the dome 24. Thus, any sea water or rain which may enter the dome through the vent apertures 29, will drain out through the apertures 30. While I have so provided the drum with four vent apertures 29, and a similar number of drain apertures 30, it is to be understood that any desired number of the apertures 29 and 30 may be employed.

Means are also provided to limit the upward movement of the intake valve 21 in its proper position within the valve chamber 15. For this purpose I provide a pair of stop members which in this instance consist of a pair of rods 31 and 32 which extend across the valve chamber 15 above the valve 21, the ends of the rods 31 and 32 being preferably riveted at the outer wall of the casing extension 13 as indicated at 33. The rods 31 and 32 are suitably spaced from the valve 21 when the latter is in its closed position and the arrangement is such that the valve 21 is retained in operative position and guided in its travel by means of said rods.

The present vent relief valve also includes means to prevent sea water from splashing into the inlet portion 23 of the valve chamber 15 and for this purpose I provide in the present instance an inlet portion 34 having a flange 35 secured to a substantially similar flange 36 at the lower part of the casing extension 13, by means of bolts 37. This inlet portion 34 includes a plurality of baffle members 38 which extend from opposite walls of the inlet portion 34, in staggered relationship, the baffles 38 being preferably downwardly inclined. The baffles 38 effectually resist the passage of water into the valve chamber 15 by preventing the same from splashing into the valve intake portion 23.

The hereinabove described construction admits of considerable modification without departing from the invention; therefore, I do not wish to be limited to the precise arrangements shown and described, which are as aforesaid, by way of illustration merely. In other words, the scope of protection contemplated is to be taken solely from the appended claims, interpreted as broadly as is consistent with the prior art.

What is claimed is:

1. A vent relief valve for tanks and the like, including a hollow casing having means for attachment to the vent pipe of the tank and the like, a right angular extension integral with the upper terminus of said casing, said extension including a valve chamber having an upwardly directed outlet and a downwardly directed inlet, annular valve seats in said valve chamber, spherical outlet and inlet ball valve members mounted on said seats, a dome secured to said casing extension above said outlet valve, said dome having outlet apertures at its upper part and drain apertures adjacent to said outlet valve seat, stop means to limit and guide the movement of said inlet valve and means to prevent operation of said inlet valve from the exterior.

2. A vent relief valve for tanks and the like, including a casing having means for attachment to the vent pipe of the tank and the like, a right angular extension integral with the upper terminus of said casing, said extension including a valve chamber having an upwardly directed outlet and a downwardly directed inlet, annular valve seats in said valve chamber, spherical outlet and inlet ball valve members mounted on said seats, a dome secured to said casing extension above said outlet valve, said dome having outlet apertures at its upper part and drain apertures adjacent to said outlet valve seat, a pair of stop members extending transversely across said valve chamber above said inlet valve to limit and guide the movement of the latter, and means to prevent operation of said inlet valve from the exterior.

3. A vent relief valve for tanks and the like, including a casing having means for attachment to the vent pipe of the tank and the like, said casing being of elbow form, a right angular extension integral with the upper terminus of said casing, said extension including a valve chamber having an upwardly directed outlet and a downwardly directed inlet, annular valve seats in said valve chamber, spherical outlet and inlet ball valve members mounted on said seats, a dome secured to said casing extension above said outlet valve, said dome having outlet apertures at its upper part and drain apertures adjacent to said outlet valve seat, a pair of stop members extending transversely across said valve chamber above said inlet valve to limit and guide the movement of the latter, and means to prevent operation of said inlet valve from the exterior, said means including an inlet extension portion secured to said casing extension, and a plurality of oppositely directed, downwardly inclined, alternating baffle members within said inlet extension portion.

In testimony whereof I hereby affix my signature.

MATTHEW M. MARSHALL.